Patented Apr. 22, 1952

2,593,800

UNITED STATES PATENT OFFICE 2,593,800

PREPARATION OF 2-MERCAPTO-ARYLENE-THIAZOLE - 6 - SULPHONIC ACIDS AND SALTS THEREOF

Albert Sander, Essen, Germany, assignor to Th. Goldschmidt A. G., Essen, Germany, a German body corporate No Drawing. Application September 13, 1949, Serial No. 115,567. In Germany October 1, 1948

8 Claims. (Cl. 260—299)

It is known that benzothiazyl-2.2'-disulphide is formed in the treatment of 2-mercaptobenzothiazole with oxidising agents, and also by heating with concentrated sulphuric acid by the process according to U. S. patent specification No. 1,963,019. On the other hand, stronger action of these reagents, for example greater heating with concentrated sulphuric acid, causes resinification and breaking up of the benzothiazole molecule.

The surprising discovery has now been made that if 2-mercaptobenzothiazole is reacted under certain conditions with fuming sulphuric acid instead of with concentrated sulphuric acid, these conversions do not take place, but 2-mercapto-benzothiazole-6-sulphonic acid is obtained in a practically quantitative yield. A temperature range of from 100°–120° C. has been found particularly favourable to the course of the reaction. It could not be foreseen that the reaction would follow this course because according to previous experience the action of oleum, which is also a strong oxidising agent, should give benzothiazole disulphide or, at the best, the sulphonic acid thereof, provided that the thiazole ring, which is comparatively easy to split, does not give rise to secondary or decomposing reactions in this action.

Use is made of the aforesaid surprising discovery in the process according to the invention for the production of 2-mercapto-arylene-thiazole-6-sulphonic acids and the salts thereof, which process resides in treating 2-mercaptobenzothiazole, the disulphide thereof or derivatives of mercapto-benzothiazole which are substituted in the aromatic nucleus, with oleum at increased temperature, preferably at 100°–120° C., and thereafter further working up the reaction mixture to the form of the pure sulphonic acid or salts thereof. It is particularly advantageous to operate with excess quantities of fuming sulphuric acid, amounting to about two to three times the quantity theoretically required, the said fuming sulphuric acid preferably containing at least 40% of $SO_3$.

The sulphonation mixtures may be worked up, for example, by liming out and converting the calcium salts into disodium-mercaptide-arylene-thiazole-6-sulphonate.

In addition, the sulphonation mixture may be worked up into the difficultly soluble acid zinc mercapto-arylene-thiazole-6-sulphonate by treating the dilute sulphuric acid solution under heat with zinc powder, filtering the hot solution from the undissolved zinc and separating the acid zinc salt by crystallising-out. The acid zinc salts of the mercapto-arylene-thiazole-6-sulphonic acid which are thus obtained can be converted into the corresponding sodium salts by treatment with a soda solution, separation from the basic zinc carbonate and evaporation of the sodium solution.

The free 2-mercapto-arylene-6-sulphonic acids can be prepared by acidifying the solutions of the salts thereof with strong mineral acids, crystallising out the free sulphonic acids and separating them from the mother liquor, for example by filtration.

The sulphonic acid obtained within the scope of the process according to the invention differs from the 2-mercapto-benzothiazole-5-sulphonic acid obtained by the known process according to German patent specification No. 518,206 by way of the 2-nitro-1-chlorobenzene-4-sulphonic acid by the fact that it has considerably greater solubility in water. It constitutes the isomeric 2-mercapto-benzothiazole-6-sulphonic acid, which has hitherto only been obtainable with difficulty. The same sulphonic acid was surprisingly also obtained when this sulphonation was started with the 2.2'-disulphide of 2-mercapto-benzothiazole, instead of the 2-mercapto-benzothiazole itself. In this case also, not the expected sulphonic acid of benzothiazyl disulphide, but only 2-mercapto-benzothiazole-6-sulphonic acid is obtained.

As mercapto-benzothiazole-6-sulphonic acid, which it has hitherto only been possible to obtain by complicated and expensive means, has now been rendered obtainable in a simple, convenient and inexpensive manner, the present invention costitutes a considerable technical and economic advance. The manner in which the process according to the invention is carried out will be more fully explained in the following examples, it being possible to vary the quantities, concentrations and temperature of the reaction mixture therein within wide limits.

Example I 170 kg. of 2-mercapto-benzothiazole are dissolved with agitation in 500 kg. of oleum having a 40%–45% $SO_3$ content in an iron sulphonator at a temperature not exceeding 60° C., slowly heated to about 110°–120° C. and kept at this temperature until a completely water-soluble specimen is obtained, which happens after a short time, generally amounting to about 20–30 minutes. The molten mass is then preferably allowed to cool somewhat and poured into 3000 l. of water, and the sulphuric acid solution is limed out in the hot state with milk of lime. The solution of the calcium salt of 2-mercaptobenzothiazole-6-sulphonic acid which is separated from the precipitated gypsum is then converted into the very slightly soluble disodium-2-mercapto-benzothiazole-6-sulphonate.

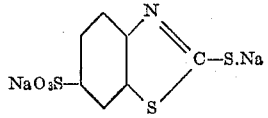

which remains in very pure form as an odourless powder when the aqueous solution is evaporated. The yield amounts to 290–300 kg. of very pure technical product and is thus close to the theoretical value. An acid zinc salt is formed, which is difficultly soluble in dilute sulphuric acid and which separates from the hot concentrated solution in large colourless laminated crystals.

If an aqueous solution of the sodium salt is mixed with a large excess of hydrochloric acid or sulphuric acid, the free 2-mercapto-benzothiazole-6-sulphonic acid crystallises out in the form of fine colourless feathery needles when left in the cold.

*Example II*

200 kg. of benzothiazyl-2.2'-disulphide are sulphonated in accordance with Example I in 600 kg. of oleum having an approximately 25% SO₃ content, until a specimen soluble in water is obtained. When the sulphonation mixture is worked up in the manner described in Example I, the sodium mercaptide of 2-mercapto-benzothiazole-6-sulphonate is also obtained in an excellent yield.

*Example III*

If the sulphonation mixture obtained in accordance with the preceding examples is diluted with water to a sulphuric acid content of about 20% and if into this acid solution, heated to 60°–80° C., 150–200 kg. of zinc powder are gradually added, the acid zinc salt of sulphonic acid crystallises in the form of large colourless laminated crystals from the light-yellow to colourless solution filtered off from the undissolved zinc dust residue, and analysis shows that the said zinc salt has the following formula:

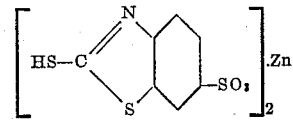

By conversion of the aqueous solution of the zinc salt with the corresponding quantity of soda and separation of the precipitated basic zinc carbonate by filtration, the 2-sodium mercaptide-6-sulphonate described in the previous examples is obtained.

*Example IV*

If the 2-mercapto-benzothiazole of Example I is replaced by 180 kg. of 2-mercapto-5-methyl-benzothiazole (obtained by the process according to German patent specification No. 518,206 from 3-nitro-4-chlorotoluene), the sodium salt of 2-mercapto-5-methylbenzothiazole-6-sulphonic acid, having similar properties to the non-alkylated compound, is obtained in very good yield by the method described in the said example.

I claim:

1. In a process for the preparation of 2-mercapto-arylene-thiazole-6-sulphonates, the step which comprises heating a material selected from the group consisting of 2-mercapto benzothiazole, the disulphide thereof, and 2-mercapto 5-alkyl benzothiazole, with fuming sulphuric acid at a temperature between 100° C. and 120° C.

2. In a process in accordance with claim 1, in which the quantity of fuming sulphuric acid employed is two to three times the theoretical quantity.

3. In a process in accordance with claim 1, in which the quantity of fuming sulphuric acid employed is two to three times the theoretical quantity, and said fuming sulphuric acid has an SO₃ content of at least about 40%.

4. A process in accordance with claim 1, comprising in addition the steps of liming out the sulphonation mixture, and converting the calcium salt of the resulting 2-mercapto-arylene-thiazole sulphonic acid into the corresponding disodium salt.

5. A process in accordance with claim 1, comprising in addition the steps of treating the sulphonation mixture at a raised temperature with an excess of zinc dust, removing the undissolved zinc dust and crystallizing out the resultant acid zinc salt of 2-mercapto-arylene-thiazole-6-sulphonic acid.

6. A process in accordance with claim 1, comprising in addition the steps of treating the sulphonation mixture at a raised temperature with an excess of zinc dust, removing the undissolved zinc dust, treating the resultant zinc salt with a soda solution to convert the zinc salt to the sodium salt, separating the basic zinc carbonate from the resulting solution, and evaporating the remaining sodium salt solution.

7. A process in accordance with claim 1, comprising in addition the steps of liming out the sulphonation mixture, converting the calcium salt of the resulting 2-mercapto-arylene-thiazole sulphonic acid into the corresponding disodium salt, acidifying a solution of said sodium salt with a strong mineral acid, crystallizing out the free sulphonic acid and separating it from the mother liquor.

8. A process in accordance with claim 1, comprising in addition the steps of treating the sulphonation mixture at a raised temperature with an excess of zinc dust, removing the undissolved zinc dust, treating the resultant zinc salt with a soda solution to convert the zinc salt to the sodium salt, separating the basic zinc carbonate from the resulting solution, acidifying the solution with a strong mineral acid crystallizing out the free sulphonic acid and separating it from the mother liquor.

ALBERT SANDER.

REFERENCES CITED

The following references are of record in the file of this patent:

UNITED STATES PATENTS

| Number | Name | Date |
|---|---|---|
| Re. 22,548 | Brandt | Sept. 26, 1944 |
| 1,547,186 | Weiss | July 28, 1925 |
| 1,750,651 | Vignos | Mar. 18, 1930 |
| 1,963,019 | Harmon | Oct. 8, 1932 |
| 2,349,598 | Roberts | Mar. 23, 1944 |